(12) United States Patent
Olet et al.

(10) Patent No.: US 10,555,036 B2
(45) Date of Patent: Feb. 4, 2020

(54) TRANSFER VIABILITY MEASUREMENT SYSTEM FOR CONVERSION OF TWO-DIMENSIONAL CONTENT TO 360 DEGREE CONTENT

(71) Applicant: AtoNemic Labs, LLC, Monroe Township, NJ (US)

(72) Inventors: JacQues Olet, Ocean Grove, NJ (US); Anthony Marks, Monroe Township, NJ (US)

(73) Assignee: AtoNemic Labs, LLC, Monroe Township, NJ (US)

( * ) Notice: Subject to any disclaimer, the term of this patent is extended or adjusted under 35 U.S.C. 154(b) by 0 days.

(21) Appl. No.: 15/991,214

(22) Filed: May 29, 2018

(65) Prior Publication Data

US 2018/0352297 A1    Dec. 6, 2018

Related U.S. Application Data

(60) Provisional application No. 62/512,670, filed on May 30, 2017.

(51) Int. Cl.
*H04N 21/4402*    (2011.01)
*G06K 9/00*    (2006.01)

(52) U.S. Cl.
CPC . *H04N 21/440236* (2013.01); *G06K 9/00751* (2013.01); *G06K 9/00765* (2013.01); *H04N 21/440245* (2013.01)

(58) Field of Classification Search
None
See application file for complete search history.

(56) References Cited

U.S. PATENT DOCUMENTS

| | | | |
|---|---|---|---|
| 9,436,876 B1* | 9/2016 | Carlson | G06K 9/6224 |
| 2004/0125877 A1* | 7/2004 | Chang | G06K 9/00335 |
| | | | 375/240.28 |
| 2012/0213438 A1* | 8/2012 | Quan | G06K 9/00744 |
| | | | 382/170 |
| 2015/0082349 A1* | 3/2015 | Ishtiaq | H04N 21/23418 |
| | | | 725/40 |
| 2017/0116465 A1* | 4/2017 | Ma | G06K 9/00288 |

* cited by examiner

*Primary Examiner* — Kate H Luo
(74) *Attorney, Agent, or Firm* — Socal IP Law Group LLP; Jonathan Pearce (57) ABSTRACT

There is disclosed an apparatus for generating a transfer viability measurement. The apparatus receives a digital audiovisual work and an associated textual script associated with the digital audiovisual work, analyzes the digital audiovisual work to generate dialogue text from audio dialogue in the digital audiovisual work, and compares the textual script with the dialogue text to generate a series of subdivisions of the digital audiovisual work. Then, the apparatus analyzes each of the series of subdivisions using a transfer viability algorithm to generate individual transfer viability scores for each of the subdivisions and an aggregate transfer viability score for the digital audiovisual work as a whole, the individual transfer viability scores and the aggregate transfer viability score indicative of a potential for accurately converting the subdivisions and the digital audiovisual work as a whole into three hundred sixty degree video.

13 Claims, 6 Drawing Sheets

TRANSFER VIABILITY MEASUREMENT SYSTEM FOR CONVERSION OF TWO-DIMENSIONAL CONTENT TO 360 DEGREE CONTENT

RELATED APPLICATION INFORMATION

This patent claims priority from provisional patent application 62/512,670, filed May 30, 2017, entitled, "2D to 360 Transfer Viability Measurement System."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to conversion of digital audiovisual content to three hundred sixty degree video for viewing in augmented reality, virtual reality and similar content viewers.

Description of the Related Art

There exists a huge trove of audiovisual content that has been created in the last century. That audiovisual content, in the form of works such as films, television series, two-dimensional cartoons, three-dimensional digital animation, documentaries, comedy shorts and news reels, and similar content was recorded in a medium that provides only two dimensions: width and height. As used herein "two-dimensional content" or "digital audiovisual work" means traditional audiovisual media recorded on film (or digitally) with audio with the viewable content thereof limited to a particular height and width per frame of video. The best cinematographers gradually grew the scope of two-dimensional film to incorporate elements of depth (e.g. focus on nearby objects or distant objects) within the film, for purposes of storytelling and to add to the overall scope and grandeur of the art form.

Still, the works themselves remain fixed within their two-dimensional medium. Arguably, a third dimension is present in film in the form of the time over which a moving picture is played or created, but for purposes of this description, this third dimension is not particularly relevant. That time is also present in the resulting content that is envisioned to be created as a result of the transfer viability measurement created as a result of the systems and methods described herein.

In the last five to ten years, augmented reality and virtual reality headsets, mobile devices, and similar devices capable of viewing so-called 360 degree content have become much more widely adopted. Mobile phones with relatively powerful processors are ubiquitous throughout the developed world. As a result, there is a demand for content that can be presented in such a way that it may be viewed in 360 degrees.

As used herein, "360 degree" or "three hundred sixty degree" video and other content, means content that may be viewed in such a way that a viewer may turn his or her head (or viewing device in the case of, for example, a mobile device) in 360 degrees and view content in each of those 360 degrees. Typically, three hundred sixty degree videos are a series of images, captured at relevant angles from a central point, that are "stitched together" digitally to form a 360 degree "bubble" in which a viewer using, for example, a virtual reality headset may view the entire scene within that "bubble" by changing his or her view of that scene, typically shown from that same central point. In some cases, the entirety of the 360 degrees may not include video or rendered content if quality content, as determined by the metric described herein, cannot be created for a portion of the full 360 degrees.

Also, "180 degree" or "one hundred eighty degree" content is content that is designed for one-half circular turning of a user's head while viewing such that it is larger than a traditional flat screen, but still provides a more immersive experience that two-dimensional content. In situations in which three hundred sixty degree video is not possible, one hundred eighty degree video may be as a partial conversion or partial solution. This one hundred eighty degree video may be implemented as a three hundred sixty degree video where a user can turn his or her head the full three hundred sixty degrees, but content does not appear outside of the rendered one hundred eighty degrees. Or, a user's perspective may be purposefully limited to the visible one hundred eighty degrees.

Other field of view or rendering limitations such as one hundred twenty degree content, or ninety degree content, or still other ranges may be created using these same methods and systems. The ranges for a particular two-dimensional content may be determined based upon the viability of that content for translation into three hundred sixty degree content or the overall coverage of the various locations for recreation in three dimensions. For example, if several locations in a two-dimensional content only provide adequate information about one hundred twenty degrees of viewing area, then the two-dimensional content may have a very low transfer viability score for three hundred sixty degree video, but a relatively high transfer viability score for one hundred twenty degrees video. During a resulting conversion, one hundred twenty degrees may be made available to a viewer with hard limits on that user turning his or her vision outside of that range (or merely limiting the visible area—e.g. the rest of the three hundred sixty degrees are black). Alternatively, the full three hundred sixty degrees may be made available to a viewer, but with only a portion of that range incorporating visible images.

The two-dimensional content of the last century can be quite compelling. Those in the various film industries, and owners of two-dimensional content, wish to present their legacy content in compelling ways for viewing in 360 degrees. However, the conversion is, perhaps obviously, not direct. The two-dimensional content simply does not have the content "behind," so to speak, the viewer. It is designed to be viewed in such a way that the viewer sees only what the camera sees, not what is behind the camera or to the sides just out of the frame.

However, some two-dimensional content is shot in such a way that a three hundred sixty degree scene may be recreated from scenes within the same time-frame or scene. For example, so-called "coverage" of a scene from two actor's perspectives is used to generally show the same location (or scene) from two vantage points, one of the view of a first speaker, the other of the view as viewed by the first speaker. These scenes typically include background details and, often, film is shot with such a wide aspect ratio that many details of the backgrounds behind each actor are visible to the camera in one or more of the shots.

Still, for other films, particularly older films generally of a single scene or single camera angle per scene, conversion may not be possible or maybe much more difficult. However, hiring a person of skill in conversion of two dimensional content to three hundred sixty degree content to scan through hours and hours of a particular film or television distributors library of back titles would be extremely expensive and time-consuming. It would be beneficial if at least a portion of this process could be automated.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
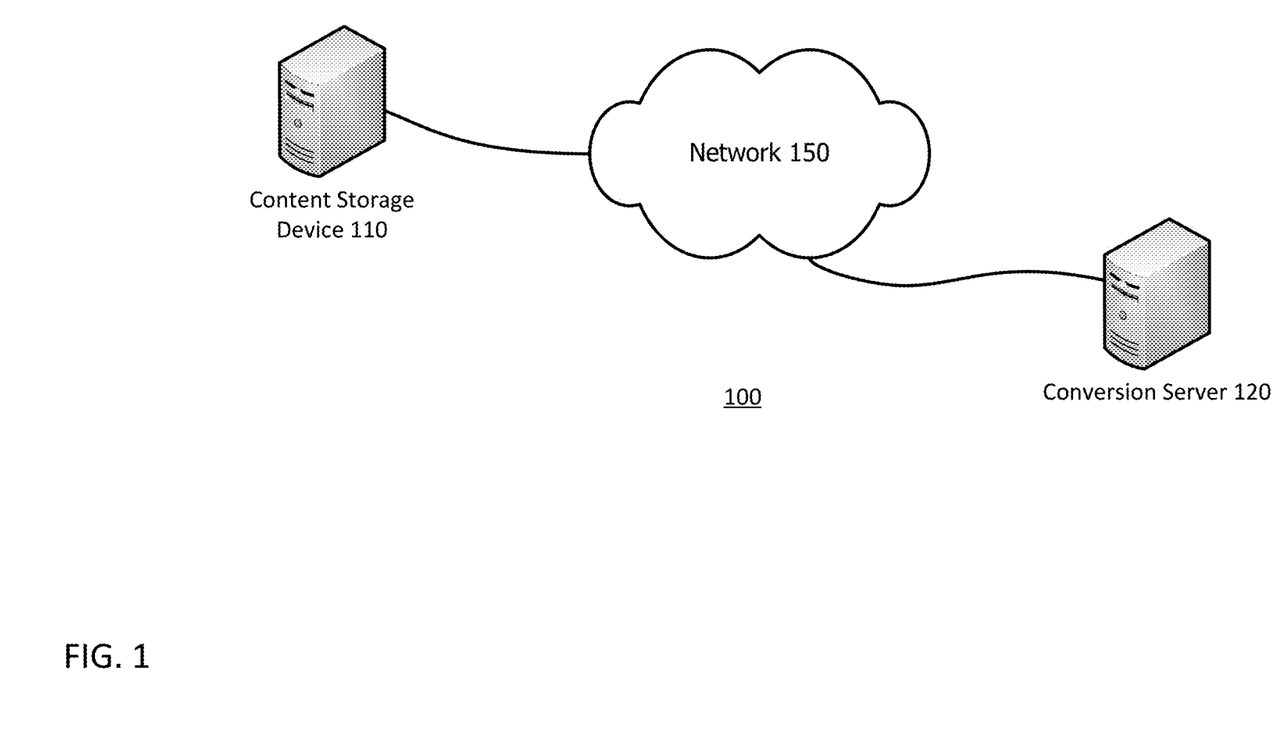
FIG. 1 is a diagram of a system for transfer viability measurement.

Referring now to FIG. 1, a diagram of a system 100 for transfer viability measurement is shown. The system 100 includes a content storage device 110, a conversion server 120, interlinked by a network 150.

The content storage device 110 is a computing device that stores content. This content may be two-dimensional media such as a digital audiovisual work or may, eventually, be three hundred sixty degree video that has been converted from two-dimensional media. The content storage device 110 may receive its content from film cameras, conversions of VHS, Betamax, DVD, Blu-ray, master films, or other sources of two-dimensional media. The content stored on the content storage device 110 is preferably in a high-quality digital format, suitable for operation upon by the conversion server 120, discussed below.

Though discussed as though it is a distinct device, the content storage device 110 may be incorporated into the conversion server 120 in some cases. In other cases, the content storage device 110 may be operated or managed by an owner of certain two-dimensional media as a repository of that media, while the conversion server 120 is merely a temporary repository of the two-dimensional media and, eventual, three hundred sixty degree video before it is returned to the control of the owner of the original two-dimensional media.

The conversion server 120 is a computing device that evaluates media content for conversion from a two-dimensional form into a three hundred sixty degree form and, thereafter, may perform a conversion of the content. The conversion server 120 may also have media storage capabilities, for storing the two-dimensional media and the converted three hundred sixty degree video. The conversion server 120 may also perform other operations such as evaluating the two-dimensional media for characteristics that make conversion more or less viable. Although shown as a single server, the conversion server 120 may be a distributed network of servers or compute services. The conversion server 120 may initiate operations of multiple physical devices operating on one or more services (e.g. compute on demand services such as Microsoft® Azure®) when put into motion to perform the processes described herein.

The network 150 is a computer network that joins the content storage device 110 and conversion server 120. The network may be or include the Internet. The network 150 enables content to be transferred between the content storage device 110 and the conversion server 120.

Figure 2:
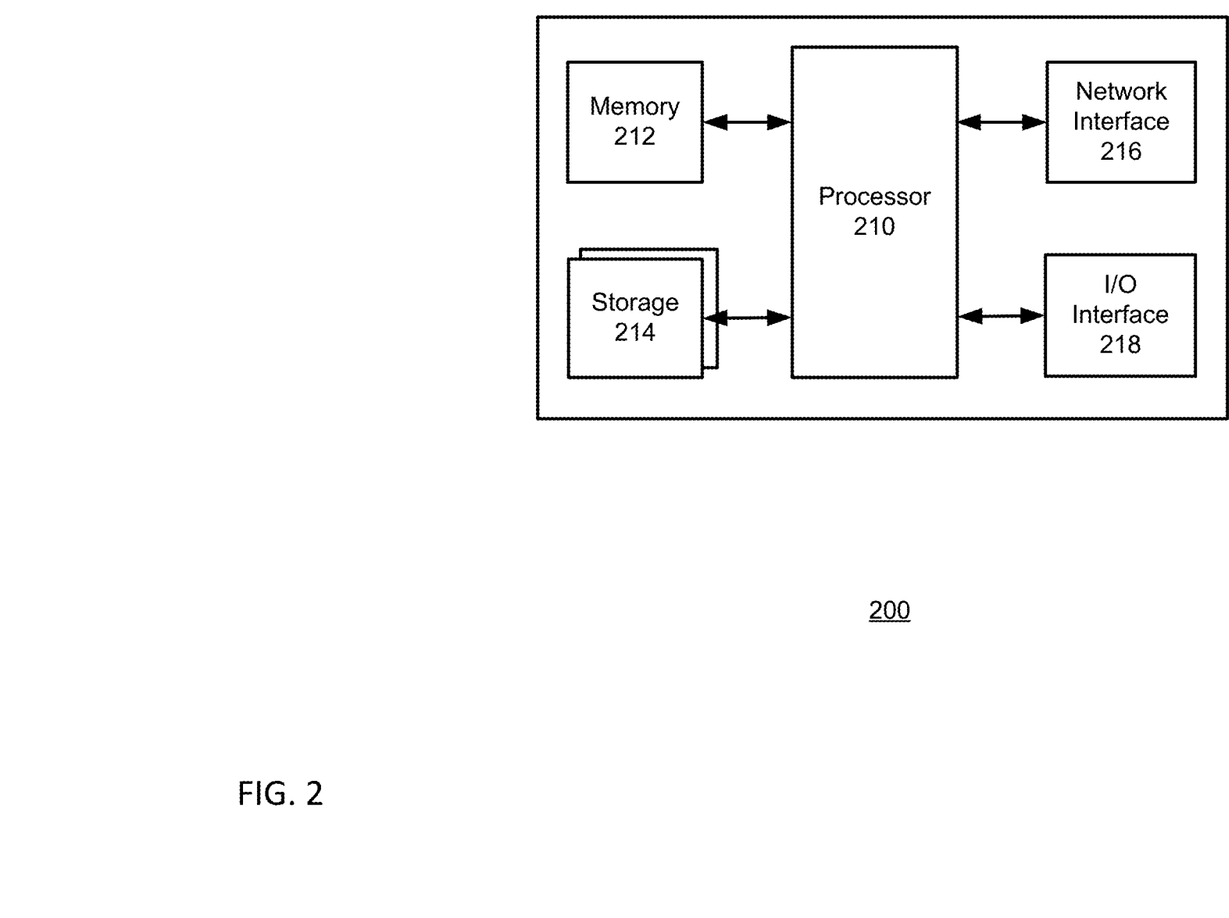
FIG. 2 is a block diagram of a computing device.

Turning now to FIG. 2 there is shown a block diagram of a computing device 200, which is representative of the content storage device 110, and the conversion server 120 in FIG. 1. The computing device 200 may be, for example, a desktop or laptop computer, a server computer, a tablet, a smartphone or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs).

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210. As used herein the term "memory" corresponds to the memory 212 and explicitly excludes transitory media such as signals or waveforms The storage 214 provides non-volatile, bulk or long-term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the terms "storage" and "storage medium" correspond to the storage 214 and explicitly exclude transitory media such as signals or waveforms. In some cases, such as those involving solid state memory devices, the memory 212 and storage 214 may be a single device.

The network interface 216 includes an interface to a network such as network 150 (FIG. 1). The network interface 216 may be wired or wireless.

The I/O interface 218 interfaces the processor 210 to peripherals (not shown) such as displays, video and still cameras, microphones, keyboards and USB devices.

Figure 3:
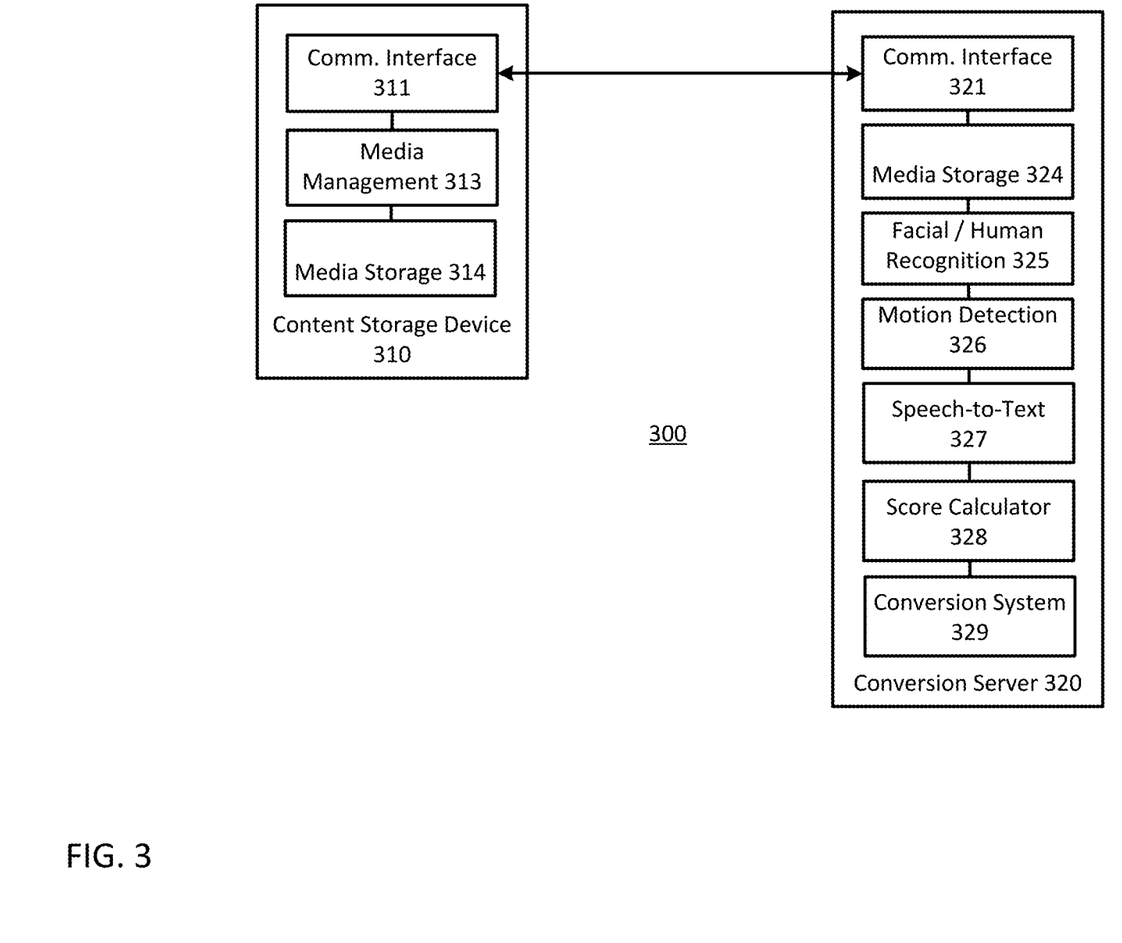
FIG. 3 is a functional diagram of a system for transfer viability measurement.

Turning to FIG. 3, a functional diagram of a system 300 for transfer viability measurement is shown. The system 300 includes the content storage device 310 and the conversion server 320. The content storage device 310 includes a communications interface 311, media management 313, and media storage 314. The conversion server 320 includes a communications interface 321, media storage 324, facial/human recognition 325, motion detection 326, a speech-to-text 327, a score calculator 328, and a conversion system 329.

The communications interface 311 enables communication between the content storage device 310 and external devices over the network 150 (FIG. 1). These devices with which the content storage device 310 may communicate include the conversion server 320. In such cases, the communications interface 311 may be used to transmit (or receive) content that is being moved to (or returned from) the conversion server 320 for purposes of generating a transfer viability measurement and, eventually, an actual conversion.

The media management 313 may be a database and/or content security and control system that ensures that content is categorized, organized, and that maintains the content secure from accidental revision, deletion, or access by unauthorized third parties. In order to for the conversion server 320 to access the content, authentication or other access controls may be required. Likewise, media management may categorize and organize any stored digital audiovisual content. This may include a database storing attributes of the associated media such as year of production, title, actors, directors, quality level of the original recording media, and other, similar attributes.

The media storage 314 stores media in a digital form as digital audiovisual media or content. These are, preferably, lossless formats such that every pixel, in raw format, is maintained. These lossless formats also enable accurate determinations by the conversion server 320, discussed below, regarding motion of the digital audiovisual media, changes and transitions between frames of the digital audiovisual media, and other operations. In other cases, a so-called "lossy" format (e.g. mpeg-2 or mpeg-4) may be used, and may actually aid in some evaluations of some characteristics of the digital audiovisual media. The media storage 314 may be or include multiple physical storage devices, such as solid state drives or traditional spinning disk drives, and may be spread across multiple physical devices and locations (e.g. a content delivery network or distributed storage system).

The communications interface 321 serves a similar function to that of the communications interface 311. However, the communications interface 321 operates for the conversion server 320 to communicate over a network with other devices. The conversion server 320 may communicate with devices other than the content storage device 310, for example, to receive updates to functionality or software, or to operate at the request of administrators or other users.

The media storage 324 is a repository of two-dimensional media and three hundred sixty degree video for the conversion server 320. The media storage 324 may be or include multiple physical storage devices, such as solid state drives or traditional spinning disk drives, and may be spread across multiple physical devices and locations (e.g. a content delivery network or distributed storage system).

The facial/human recognition 325 is software, and potentially specialized hardware, for recognition of human faces and/or human forms within a digital audiovisual work, such as a two-dimensional video. Facial recognition processes have been known for some time that rely upon identifying facial focal points, such as eyes, eyebrows, nostrils and mouth, and thereby determining that a particular form in an image (still or a frame of a motion picture) is a human face. These types of algorithms have increased in complexity, becoming highly accurate in the last several years.

Still other algorithms employ neural networks to identify faces using machine learning that is "trained" on a dataset of images including human faces and images not including human faces. These types of algorithms rely less upon individual characteristics often associated with a human face and more upon a wholistic approach that incorporates probabilities that a given shape or form in an image (or multiple shapes or forms) is a human face. Such algorithms, when trained upon large-enough quality datasets are quite adept at detecting human faces, no matter what angle those faces are presented to the screen.

Either of these algorithms become even more accurate when they are able to generate these probabilities over the course of a series of frames of related video that are typically present in two-dimensional content such as digital audiovisual works. Similar processes, both characteristic matching, and neural networks, may be applied to enabling the facial/human recognition 325 to identify human forms within images, such as individual frames of a two-dimensional video, as discussed more fully below.

The motion detection 326 is software, and potentially specialized hardware, for detecting motion within individual frames or a series of frames of two-dimensional content, such as a digital audiovisual work. This motion may be motion of actors, cars, or the scene itself. However, this motion may also be motion of the camera, relative to the actors, cars, or scene. Different algorithms may work with respect to each. In general, motion in individual frames may be detected through blur that is captured by rapid movement across an image. Individual objects blurring tends to show movement of that specific object. In contrast, blurring of an entire frame of a digital audiovisual work tends to show that the camera itself was in motion.

Rapid motion is easier to detect, even motion that does not cause a blur, across multiple frames of a digital audiovisual work. Even the encoding schemes of many digital video formats look for similar pixels from frame-to-frame. When it is not present, keyframes must be updated. If relatively large (relative to the frame of video) recognizable objects appear to have moved, but generally retain their shape and pixel colors and remain partially or fully within the frame from frame-to-frame of video, then movement can be detected, either of the camera or of the scene or actor. Action sequences have much movement, while dialogue sequences typically have little. All of this may be detected by the motion detection 326, as discussed more fully below.

Speech-to-text 327 is software, and potentially specialized hardware, that is capable of "listening" to a digital audiovisual work and capturing the dialogue. Then, the speech-to-text may convert that dialogue into text for purposes of comparison, discussed below, with a shooting script or other source of textual content for the digital audiovisual work. The associated text, generated by the speech-to-text 327 may be stored in the media storage 324.

The score calculator 328 relies upon aspects of the conversion server 320 such as the facial/human recognition 325, motion detection 326, and other determinations about the relevant digital audiovisual work to generate a series of scores. The details regarding these scores will be discussed below, but these scores cumulatively result in a determination of a transfer viability measurement, meaning the viability of transferring (or converting) the two-dimensional content, such as a digital audiovisual work into a three hundred sixty degree video.

The conversion system 329 is responsible for performing the actual conversion of the digital audiovisual work into the three hundred sixty degree video. The conversion system 329 is software, and potentially specialized hardware, that utilizes aspects of the two-dimensional content to generate a three hundred sixty degree video. Some or all of the three hundred sixty degrees of images may require manual "filling in" by an artist, or the conversion system 329 may be capable of performing some or all of the "filling in" on its own or to begin the process to make it more manageable for a later, human artist.

Description of Processes

Figure 4:
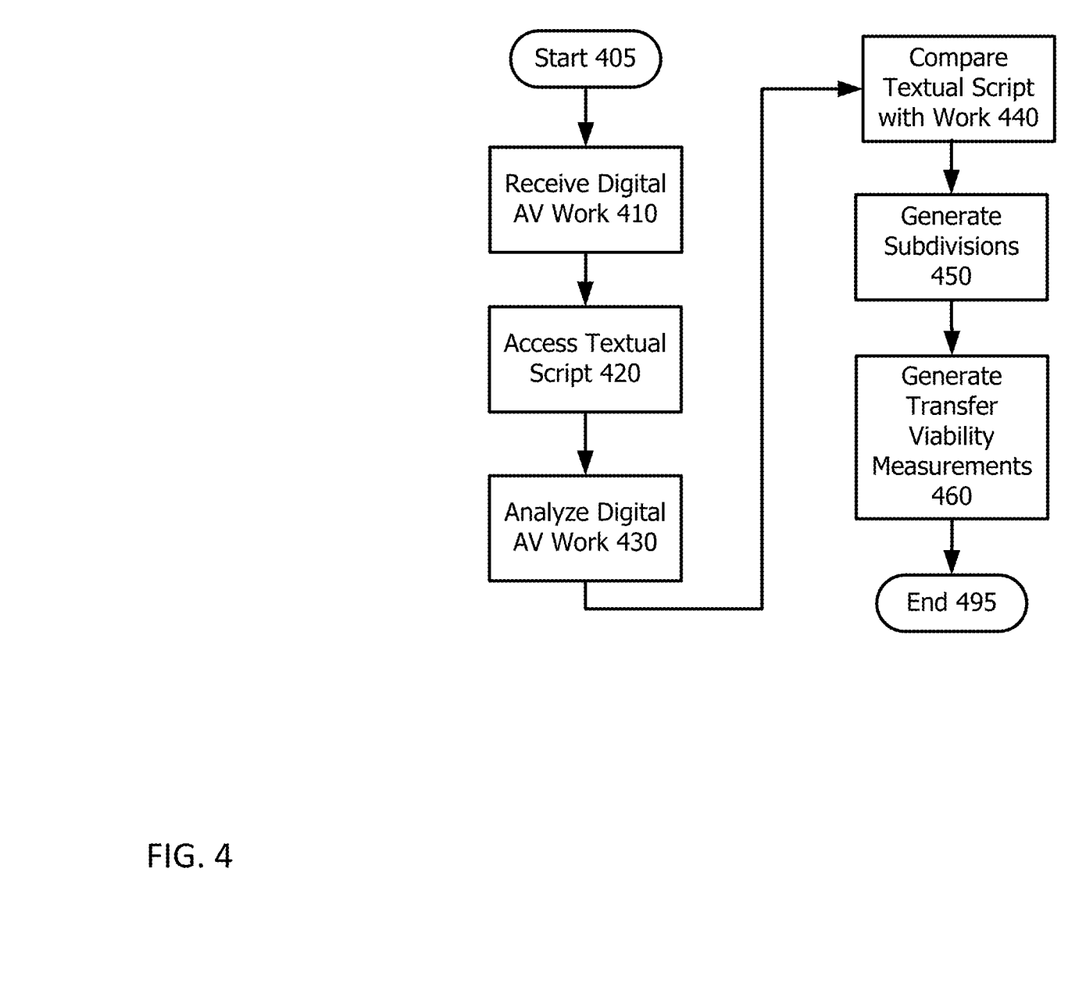
FIG. 4 is a flowchart of a process for generating a transfer viability measurement.

Referring now to FIG. 4, a flowchart of a process for generating a transfer viability measurement is shown. Though shown with a start 405 and an end 495, the process may repeat for each digital audiovisual work upon which the process is to be performed. In some cases, the process may purposefully iterate through an entire library of digital audiovisual works to generate relevant transfer viability measurements for each work. Likewise, the process may repeat for different users uploading different sets of media.

Following start 405, the process begins with receipt of the digital audiovisual work at 410. This may be physical receipt and inputting of a digital audiovisual work (e.g. receipt of a physical hard drive that is integrated into the conversion server 320). Preferably, this receipt happens digitally, for example using an upload to or download from the Internet or directly from the content storage device 310. This digital audiovisual work may include metadata embedded therein with various information including camera cuts, actors, directors, title, information regarding any synchronized audio, or various other data. However, this is unlikely to be present in older works.

Next, a textual script for the digital audiovisual work is accessed at 420. This textual script may be provided along with the metadata of the digital audiovisual work. Alternatively, the textual script may be provided in physical form (particularly for older works) or may be provided in digital form separate from the digital audiovisual work itself. In whatever case, the textual script will be or will be converted to be in a form readable by a computing device.

Next, the digital audiovisual work is analyzed at 430. This analysis "listens" to the digital audiovisual work and uses speech-to-text 327 to convert the spoken dialogue into text. That text may then be compared with the textual script received at 420. In particular, scene designators such as "[LOCATION]" from the textual script may be used as guideposts, by software during the analysis, to automatically divide the digital audiovisual work into a series of discrete scenes.

As used herein, the term "scene" is generally intended to mean a subdivision of a digital audiovisual work that takes place in a single "location." In contrast, "location" is intended to be a particular shooting location or set, with characteristics that may be detectible, either completely or partially, through a review of the scene (or scenes) at that location. A scene may be in a location, but there may be many scenes at the same location. The location may appear in only a single, short scene, or may actually appear in many scenes which may or may not be contiguous in time within the digital audiovisual work. When locations are to be reproduced in three hundred sixty degree video, the prevalence of a scene shot from many different angles can dramatically increase the likelihood that that location may be easily recreated in three dimensions or as three hundred sixty degree video simply because there are more reference frames for a human artist, or a computer animation extrapolation technique, to operate upon for information relevant to that scene.

Next, the textual script is compared with the digital audiovisual work at 440. The "[LOCATION]" tag may then be used roughly identify each change of scene as a point in time. "[LOCATION]" tag, when used in this disclosure, means the convention for each scene film and television scripts to identify the location (e.g. "LOCATION: interior, office, desk facing the camera" or "LOCATION: exterior, day, field with alien spacecraft in the distance") of each scene within a typical film script. When comparing the textual script with the spoken dialogue, the text need not actually match, but merely need be close enough to flag for an automated process performed by the conversion server 320, to determine a general time (e.g. at 45 minutes, 32 seconds into playback of the digital audiovisual work) within the digital audiovisual work where there is likely to be a scene break.

For example, use of the [LOCATION]" tag (or similar tag) within the script may indicate that a particular change of scene (e.g. a new [LOCATION] tag) follows the dialogue "Let's get out of here!" that occurs approximately at minute 45 of the runtime of the script. The speech-to-text operation performed at 430 may identify a "Let's get out of Erie!" as the result of poor speech-to-text operation at minute 42 and 36 seconds. Four out of five words match, and the time is within a few minutes of the initial textual script. In this type of circumstance, it appears likely that this is the end of that scene.

Still other information may also be relevant to this analysis. For example, a sharp cut in the digital audiovisual content immediately after the "Let's get out of Erie!" may be still one more indicator that the scene did, in fact, end. These and other characteristics of the associated digital audiovisual work may all be used to flag a series of times as either the start or end of particular scenes.

Next, the subdivisions of the digital audiovisual work are created at 450. This process results in generation of an "in point" (e.g. 10 minutes, 32 seconds) and an "out point" (e.g. 12 minutes, 42 seconds) for each subdivision of the digital audiovisual work. All of the time in between the in and out points is the time for that particular "scene" within the digital audiovisual work. The major benefit of comparing the "[LOCATION]" tag within textual scripts for the digital audiovisual work is that scenes may be intelligently split into these subdivisions in a more or less automated way. Without that relatively clear indicator, an individual may be required to manually "flag" each "in point" and "out point." Such a process would be incredibly time-consuming, and likely cost-prohibitive, especially for digital audiovisual works that did not end up being suitable for conversion to three hundred sixty degree video.

Once the various subdivisions are identified by the combination of the "[LOCATION]" tag and the speech-to-text analysis, then a plurality of transfer viability measurements may be generated. The transfer viability measurement may be a sum of a number of different factors including one or more of (a) a size of a human face within the respective subdivision, (b) a height of a human form relative to a vertical aspect of the respective subdivision, (c) a horizontal position of a human form within the respective subdivision, (d) whether or not a human form moves transitions from wholly or partially within an audiovisual frame to wholly or partially outside of an audiovisual frame of the respective subdivision, (e) a number of human forms within the respective subdivision, (f) an estimate of the movement within the respective subdivision, (g) an estimate of movement of a camera during the respective subdivision, (h) a measure of the relative lighting of the respective subdivision, (i) an estimate of the sharpness or blurriness of the respective subdivision, (j) the density of colors on a pixel-by-pixel basis for the respective subdivision, (k) a measure of a frequency of sharp transitions between scenes during the respective subdivision, and (l) one or more handicapping or weighting variables for any one of the foregoing.

The first factor may be P, the size of a subject's face within a given frame. A handicapping variable for P may be T which may be used to adjust the score either linearly (e.g. by adding or subtracting a number) or by a percentage (by modifying P by a percentage). The resulting adjusted P score may be given the variable $\Omega$, such that P+T=$\Omega$.

The size of faces within the frame (P) is important because larger faces within the frame, the less amenable a given frame is to conversion from two dimensions into three hundred sixty degree video. Conversely, the smaller the faces, the more amenable such a frame of video is to conversion. This is because it is difficult to intelligently and in a "natural" manner generate a "body" and limbs for an actor whose face dominates a given scene. Yet, such a feat would likely be necessary to provide a full three hundred sixty degree video. As a result, the larger the face, the lower the resulting face size viability score (P score).

To determine the relevant P score, facial recognition software, such as facial/human recognition 325 may be used to identify likely faces. A square is then superimposed around the surface area of each perceived face within the frame of a digital audiovisual work. There could be multiple squares in a given frame dependent upon the number of actors or subjects. The size of each facial recognition square is then measured for its relative size within each video frame.

The size of the square relative to the total size of the video frame, gives a large amount of information about what style of shot is being observed. There are many different types and styles of shots within films. The size of the facial recognition square relative to the frame size, also gives us information about the actor's size within the frame given the size of their face. Knowing the relative size of the face or faces in the scene, generally results in a description of the type of shot in a given scene (within the subdivision). The larger the facial recognition square, the more likely actor's bodies are being cropped within the video frame, and the more difficult the 360-degree re-creation process will be. This means that the larger the facial recognition square (or squares) are, this will negatively effect and lower the number value score for the P score, And the smaller the facial recognition square (or squares) the more it will positively effect and increase the number value of the P score. The P score itself may be a scale from 100 to 1 as a percentage of the frame taken up by the individual's face or may be presented as a portion of the screen not taken up by the face (both because more face is a negative for a P score).

If it is known that a particular film has characteristics that alter the typical P score (e.g. the film is a three-dimensional animated film where the characters are only large heads floating in space), then T may be altered (increased or decreased) to account for this as a handicap. The resulting $\Omega$ (which is P+T, or potentially in some embodiments P*T) will be the score used in calculating an overall transfer viability measurement for the scene (subdivision) and for the digital audiovisual work as a whole.

The next viability metric is V, a subject's vertical height proximity to an upper crop line for the scene (subdivision). As with the P score, a handicap A may be added to (or multiplied by) the V to generate an adjusted V score $\Psi$. This may take the form V+A=$\Psi$ (or in some cases V*A=$\Psi$).

The same facial recognition squares may also be measured for their location within a video frame relative to a top crop line for the scene (subdivision). In two-dimensional content, there are four crop lines in which the actor in the frame could potentially move beyond (the top, bottom, left, and right "crop lines"—the lines where, if there is anything visibly recorded beyond, it is not shown to the viewer). The top crop line is particularly important, and our software measures the vertical distance between the facial recognition squares and its proximity to the top crop line. The closer the facial recognition square is to the top crop line of the video frame, the more positive and greater the increase of the V score, the lower in the frame the facial recognition squares are, this would negatively effect and decrease the V score. Much likes the face size, this is because the higher in the frame a facial recognition square is, the more statistically likely it is a larger proportion of the actor's body is within the frame, thus less work is needed later to recreate photo-realistic CGI body parts. This process may be performed by the facial/human recognition 325.

The score itself may simply divide the entire horizontal visible frame into 100 parts (1-100) or individual pixels (e.g. 1-1080) and may be presented as a score of 95 representing that the face is 95% of the way to the top of the screen or a score of 1025 meaning that the top of the face is at pixel 1025 of 1080 (which would be the top). These and similar scores are envisioned. As above, a handicap may be added to, or multiplied by, the V score to thereby generate the $\Psi$, which is an adjusted V score. In some cases, no handicap may be used.

The next metric is H, which identifies the centrality of a particular subject. There, of course, may be multiple subjects in a given scene. Each may have their own H score. As with the P and V scores, these may be handicapped (added to or multiplied by) a handicapping variable B to generate $\delta$, an adjusted H score. The generalized form would be H+B=$\delta$ (or H*B=$\delta$).

To generate an H score, the facial recognition squares may then be measured for proximity to the horizontal center of the video frame (disregarding whether they are vertically centered). The closer to the horizontal center a square is the less likely the actor will exit the frame through the left and right crop lines during the scene. If he or she did exit the frame in such a way, this would again introduce the need for expensive CGI re-creations of their body in a 360-degree context. The closer to horizontal center a facial recognition square the greater the positive effect and increase of the H score, the further away from horizontal center, the lower that H score will be.

This proximity may be measured as a percentage distance from the center (e.g. 1-100) or as a particular pixel value from the center. If may be adjusted to arrive at the eventual 6 score.

The next metric is the C score, which is a determination whether the subject (or subjects) move outside of crop line boundaries (e.g. they move out of frame) during a given subdivision. This C score may be handicapped, much like above, by D, a handicapping variable to arrive at $\Phi$, such that $C+D=\Phi$ (or $C*D=\Phi$).

As it turns out, one of the largest introducers of difficulty within the transfer of two-dimensional content, such as a digital audiovisual work to a three hundred sixty degree video, is the cropping of actors whose complex anatomies must be photo realistically recreated with computer generated graphics. This can introduce a great monetary and time expenditure to such a conversion process. One of the single most complex recreation tasks would be the accurate recreation of the face or parts of the head itself because humans are uniquely socialized to notice unusual aspects of other human faces. The so-called "uncanny valley" effect is known in the art for nearly-correct human facial animations.

As a result, the time at which and the length of time in which the facial recognition square is outside of a crop line for a video frame is a measurement that adversely effects the viability of a digital audiovisual work for conversion to three hundred sixty degree video. Each time the facial recognition square itself moves beyond the crop line and for the length of time it stays beyond it, the value of the C score is lowered. For the time when the facial recognition square is fully within the frame, the value of C score is raised. The C score (or the $\Phi$ score) may be represented as the percentage of the given subdivision that each subject is within frame or as a total number of the amount of time within the subdivision the subject is in frame minus the amount of time the subject is out of frame.

In situations in which an actor's facial recognition square vanishes in its entirety beyond the crop line, and remains vanished for any length of time, the impact on the C score may be dramatic. This is because recreating this actor's face in this short time, directly adjacent to an actual human face, is among the most difficult of re-creation tasks, having no reference for what occurs beyond the frame, even the actor should logically still be within the visible expanded three hundred sixty degree video.

The next viability metric is the N score, the number of subjects on screen simultaneously. The N score may be handicapped, much in the same was as those above, by the E handicapping variable, to thereby generate the adjusted N score, $\zeta$. This may take the form of $N+E=\zeta$ (or $N*E=\zeta$) depending on how the handicapping is implemented.

As the number of facial recognition squares goes up, the complexity of transferring two-dimensional content, such as a digital audiovisual work scene into a three hundred sixty degree video likewise increases. This is because there are now multiple individuals in the scene and the likelihood that the scene will be complex or require special rendering or some other adjustment to result in a high quality three hundred sixty degree video increases. As a result, the more facial recognition squares that exist within the video frame, the more negative of an effect and decrease in the "Viability Metric 5" number value, the less facial recognition squares, the more positive and increased the "Viability Metric 5" numerical value will be. Zero subjects/faces in the frame would preferably give an even greater positive effect of the "Viability Metric 5" number value. The N score or $\zeta$ score may be represented as a number from 100 down to 0, with each added face detected decreasing the relevant score by 20 points. Other, similar schemes may be used.

The next metric is the M score, which is a measure of the complexity of facial movement. This may be handicapped by the G handicapping variable to generate an adjusted M score as a $\lambda$ score. The more movement throughout the frame a facial recognition square exhibits, the greater likely hood that it adds to the complexity and the work load of those attempting a conversion to three hundred sixty degree video. Therefore, the more movement throughout the frame the facial recognition square exhibits, the more negative of an effect and the more decreased the numerical value of the M score, the more motionless a facial recognition square becomes, the more positive it's effect and the greater the increase in the M score. M score (and the $\lambda$ score) may be, for example, a numerical representation of 100 being no movement in the scene (subdivision) for a given subject face, while 1 may represent constant movement.

The next metric is S, a camera steadiness score that measures how much the camera moves relative to the subdivision. The S score may be handicapped using handicapping variable Z to generate an adjusted S score, $\xi$ score as described above with regard to other variables. In particular, motion detection 326 may measure changes in the colors of the pixels that boarder one or more crop lines, to know whether the camera is fixed in place, unsteady, or in motion. The steadier the camera is judged to be the more positively effected and greater the increase in the S score, and the more movement of the camera, the more negatively effected and lower S score will be. The S score (or $\xi$ score) may be, for example, a number from 100 to 1, with 100 being better. A percentage of the overall subdivision time that includes movement of the camera may be subtracted from 100 to thereby generate the S score (or $\xi$ score).

The next metric, signified by an L score, is light distribution within the scene. As above, the L score may be handicapped using handicapping variable I to generate an adjusted L score $\omega$.

The conversion server 320 may determine the overall brightness or darkness of the scene, in addition to the contrast (distance between lightest and darkest pixels). If the frame is darker or almost blacked out, or if it's so bright that the pixel distances are relatively small, this will positively effect and increase the L score. Likewise, the L score will be decreased and negatively effected if the scene is evenly and moderately lit. The sensitivity of the L score to differences between moderate and extreme lighting and brightness preferably will be adjusted and customizable within the software. In general, when scenes are very dark or very light, the amount of detail and information needed to generate a quality three hundred sixty degree video out of such a scene (subdivision) is simpler because there is less three-dimensional information required.

The next metric is the R score, a retroactive score adjustment to the P score (or it may be used on its own as an independent adjustment) based upon the relative height of the actor to the frame. This R score may be adjusted, by a handicapping variable J score to arrive at an adjusted R score, called an $\alpha$ score.

To calculate the R score, images may be captured from specific frames in which the smallest facial recognition square was generated. This may be updated as the process of evaluating an entire digital audiovisual work goes on. Once an entire digital audiovisual work has been evaluated, the smallest sized facial recognition square will be identified from an associated database where it was stored. A human observer may judge ("yes" or "no") whether the actor within a given frame can be seen head to toe and standing upright. Software may also be used to perform this task, particularly neural network based human form recognition software. If a human observer or software judges that this is the case, the software will then take an estimated measurement of the actor's height within the frame.

The actor's height and body data can then be used to retroactively increase the accuracy of the P score or separately as its own metric, the R score. It may be presented as a booster variable (e.g. adding to the overall score) or a modifier. This is because, in some cases, if an entire body shot of an actor may be found in at least one scene, then that may be more-easily recreated in other scenes which call for full body shots of the actor when recreated as a three hundred sixty degree video. In some cases, this R score may also be used for reference or as an accuracy enhancer for other metrics.

The next metric is a Q score, which is a measure of the overall image sharpness of a given scene (subdivision). The Q score may be handicapped by a K handicapping variable in the for Q+K (or Q*K) to arrive at an adjusted Q score, a γ score.

The motion detection 326 may use blur detection algorithms to measure how much of a video frame is in focus and has a sharp visual appearance. This score may be on a percentage from 0 (very sharp) to 100 (not very sharp) with 100 being better and merely as a percentage of the frame that is sharp and non-sharp. This is because as images increase in sharpness, greater detail is needed to recreate elements which are outside the available information which appear in the digital audiovisual work. To do so, the ratio of sharp to blurry shots may be measured for a given location. If most of the scenes at a given location/scene are blurry (lacking definition), this is best, if most the scene at a location/scene are sharp, this is second best, if there is a great mixture of sharp and blurry shots, this is the worst. This is because more detail in any recreated content (e.g. extra images for the three hundred sixty degree video) is needed when the frame is quite sharp, and the need to recreate the sharp images in an accurate manner is offset and impeded by the blurry images lack of ability to assist in this task. As a result, when the images vary greatly from shot to shot in blurriness and sharpness, the Q score will be lowest. When the images are sharp, the Q score will be low, but not lowest. The more frequently and regularly blurry or softer the video's image the higher the Q score will be.

The next metric is the pixel color diversity, the O score, meaning the overall variations in pixel colors. The O score may be adjusted by a handicapping variable to arrive at an adjusted O score, a Ξ score. The conversion server may also evaluate the diversity of color in the pixels within the entirety of a video frame. The diversity of color meaning the total number of differently-colored pixels in a given frame of video.

The diversity of color amongst pixels can be indicative of the visual complexity of a given cinematic sequence, photograph, or animation. The more color diversity the pixels within the video frame, the lower the O score. The less diversity the more positively effected and larger the O score will be. This is because great pixel diversity makes it much more difficult for human or computer artistry to generate non-present data for the scene that appears to accurately represent the scene in a three hundred and sixty degree video. This O score may be on a scale of 1 to 100, with 1 representing a very complex scene of much pixel diversity, and 100 representing a pixel diversity of very few different pixel colors.

The final metric is a cut frequency metric, the F score. The cut frequency is the number of times in a given scene (subdivision) that the camera makes a hard cut from one view to another (e.g. from one actor talking on scene from a first perspective to another actor talking on scene from a different perspective). This metric may also be handicapped using a handicapping variable Y, to generate an adjusted F score, a β score.

This is a slightly-different metric in that its overall effect on the transfer viability score changes dependent upon the results from the other metrics. If the overall score, prior to application of the F score, is positive, indicating that a conversion from a two-dimensional content, such as a digital audiovisual work into a three hundred sixty degree video is likely possible and at a relatively high quality, then a large number of cuts results in a positive additional bonus to the overall score. If the overall score, prior to application of the F score, is negative, indicating that it is unlikely that a high quality three hundred sixty degree video is possible, then the F score is a negative bonus. In short, it accentuates an already-present score, whatever type it may be.

To detect cuts, the color of all pixels within a given video frame may be evaluated relative to a prior video frame. If a large percentage of them has changed from a single frame to a second single frame, then this is likely a cut between frames. The sensitivity of how many pixels changing may be adjusted manually by a user or automatically based upon a full viewing of the film (e.g. software may detect that a film is consistently dark and with a green hue and, as a result, the pixel changes required from frame to frame may be lowered, perhaps dramatically).

The reason that more cuts help in cases where the overall score is already high is that when more cuts happen, there is a higher likelihood that more geometric and visual information about the set, actors, props and photogrammetric information may be gathered. Fewer cuts result in less information. However, in general, more cuts also typically mean that the overall conversion will be more complex. So, a high cut frequency is positive only on the basis that other elements within the scene are favorable.

So, the F score may be a multiplier on a scale from 0 to 2.0 such that the rest of the scores may be multiplied by the F score to generate the overall score. When the other variables are not positive, a score lower than 1 will further reduce the over all score, while a score greater than 1 will increase the score. Alternatively, the F score may be additive, such that it merely adds its own score (e.g. the cut complexity is a score from 1-100) in either positive or negative numbers (positivity or negativity dependent upon whether the other scores meet a predetermined threshold or do not do so) to the overall score to thereby raise or lower the score by that amount.

Another metric is the repeating pattern and texture recognition metric X. This metric searches for repeat patterns and textures. This is because pattern matching or texture matching suggests that the same object appears across multiple frames. The characteristic of that object (e.g. clothing, tables, background images, etc.) may be better-determined using multiple frames of the digital audiovisual work if the textures or patterns are recognized.

To detect these texture and pattern recognition, each frame of the digital audiovisual work may be scanned to detect any repeating geometric and repeating such as floors, tiling, carpeting, street surfaces, ceiling, and wallpaper patterns, the larger amount of these patterns that exist within a shot, the more positive this metric is, the less repetition there is, the more negative this metric is.

When practically implemented, a three hundred sixty degree scene may be divided into six cube faces. The floor/ground and the ceiling/sky of a given location typically will make two whole cube faces of the six cube faces required for a 360 degree scene. Because floor/ground and ceiling/sky patterns are typically repetitive in nature (like floor tiling) a large amount of the 360 space can be recreated just from a very small amount of actual footage from the digital audiovisual work showing floor/ground or ceiling/sky pattern (because of their repetitive nature). This detected pattern may be repeated across the entirety of the top and bottom cube faces, and even sometimes beyond.

This metric may be measured on a scale of 0 to 100, with 100 being better for the expected viability of re-use of part or all of a pattern elsewhere within a location. Or, the scale may be from −100 to 100, so that negative scores may be included in the scale. Other scales may also be used. Just like the other metrics, this one may be altered by a handicapping variable, $\Delta$. And, once handicapped, may result in an adjusted repeating pattern and texture recognition metric $\varepsilon$.

The next metric is a hand to face distance/object occlusion metric Q. This metric may recognize hands and face relative size and use those to generate a measurement of the distance between the face of an actor and their hands. Then, a measurement of the amount of time the hands stay closer to the head than would be normal for the length of a human arm may be determined. Through investigation it has been discovered that if the hands stay more centered at the torso, for a given amount of time, which can be indicated and gathered by the distance of hands from the face, this is an incredibly reliable indicator that the actors are sitting at a table. Being at a table has a positive effect on this metric because more of the actor's body is occluded. In contrast, if the hands are at a normal distance from the face indicating that the hands are at an actor's sides, below the waist, this is less positive or negative. The presence of a table or other occluding object obscuring the actor is positive because it excludes the need to recreate there body beyond the obscuring object, because it is behind or under the table or other object it does not need to be re-created.

This metric may be measured on a scale of 0 to 100, with 100 being better for the expected viability of re-use of part or all of a pattern elsewhere within a location. Or, the scale may be from −100 to 100, so that negative scores may be included in the scale. Other scales may also be used. Just like the other metrics, this one may be altered by a handicapping variable, $\hat{T}$. And, once handicapped, may result in an adjusted repeating pattern and texture recognition metric $\Im$.

A final metric may be the degrees of view to be recreated °. This metric is simply a number representing either a 360 degree video or a 180 degree video (or some subset of either). This metric may be used to handicap the thresholds for all of the viability scores based on the degrees of re-creation required. Or, may bear on each of the associated handicapping variables, thereby altering their power to effect the overall viability score. If the goal is to only create 180 degrees of expansion to the visual from a digital audiovisual work, then this may effect the metrics differently. This may be a single handicapping variable that effects the entire score or may effect each of the metrics independently of one another. This is because a different amount of visual data is required for creating a one hundred eighty degree video than creating a three hundred sixty degree video. This variable is generally not handicapped because it is, itself, a handicapping variable, but may be in some implementations.

The final transfer viability measurements are calculated at 460 in two ways.

First, an individual transfer viability measurement may be calculated for each of the subdivisions (locations). Still another handicapping variable may be applied to generate a final adjusted transfer viability score for each subdivision. This interim score for each subdivision may be useful in determining which locations are problematic. And, in some cases, if only one scene is terribly problematic, that scene may be fixable, short, or cut or may be otherwise dealt with.

Second, the transfer viability measurement W may be calculated by adding all of the other scores together such as P+V+H+C+N+M+S+L+R+Q+O+F+X+Q=W. Then, as desired, the handicapping may be incorporated by T+A+B+D+E+G+Z+I+J+K+$\zeta$+Y+$\Delta$+$\hat{T}$=U, if it has not already been incorporated. Then, the final, adjusted transfer viability measurement $\chi$ may be calculated by $\Omega+\psi+\delta+\varphi+\zeta+\lambda+\xi+\omega+\alpha+\gamma+\Xi+\beta+\varepsilon+\Im=\chi$.

If a degrees of view metric ° is used, then it may be multiplied by the adjusted transfer viability measurement $\chi$. More likely, however, is that the metric ° results in a change to each of the handicapping variables, to adjust their relevance and power, relative to the overall metric, in response to each associated metric's necessity for recreating either a three hundred sixty degree video or a one hundred eighty degree video.

The process then ends at 495 after the final transfer viability measurement is created.

Figure 5:
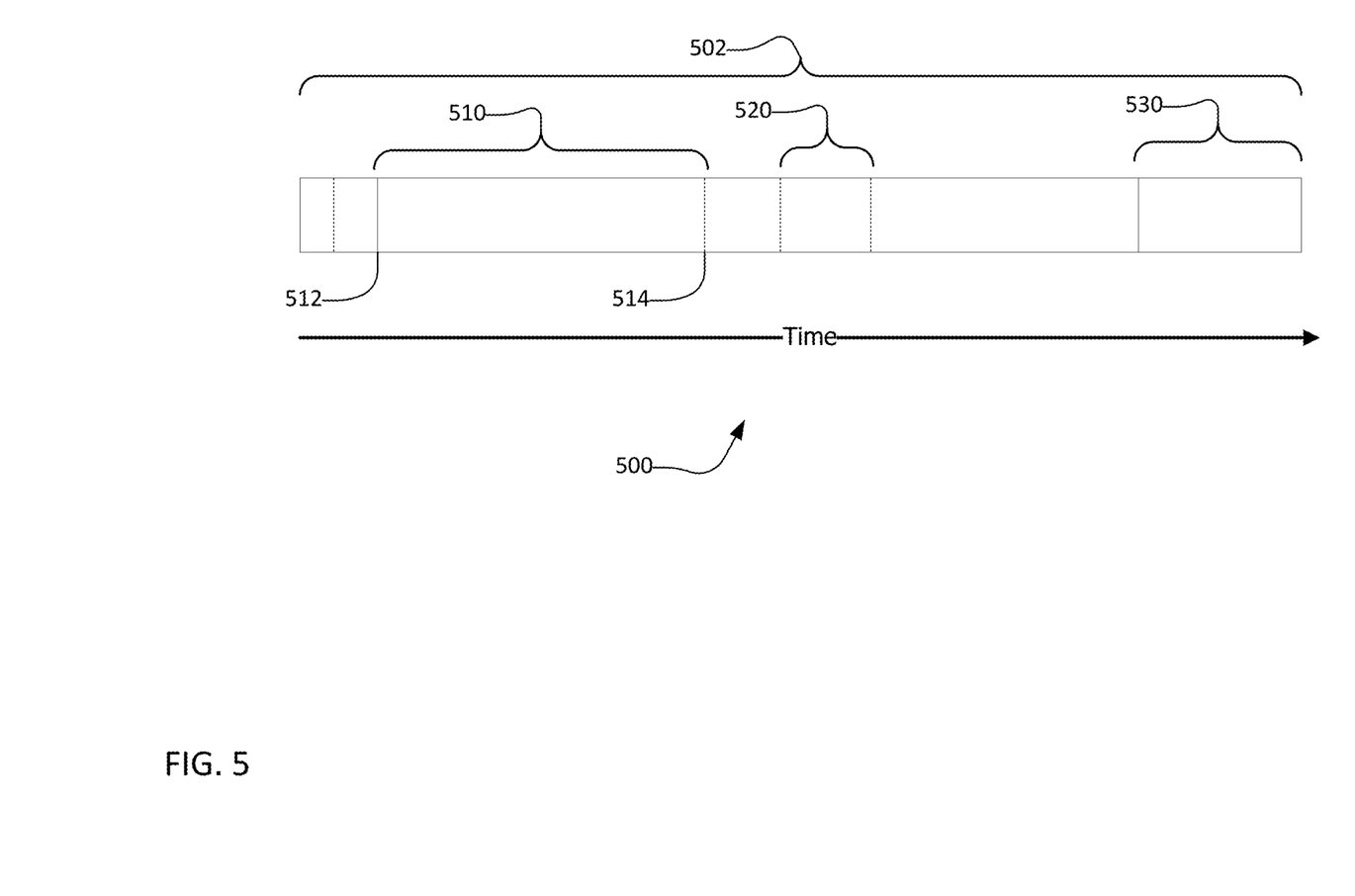
FIG. 5 is an abstraction of a digital audiovisual work.

FIG. 5 is an abstraction 500 of a digital audiovisual work 502. The abstraction 500 is presented as a timeline with the various portions of that timeline representing individual locations (subdivisions) of the digital audiovisual work 502. As described above, these locations may correspond to one or more scenes of the digital audiovisual work and may be identified using the [LOCATION] tag from a textual script. A particular subdivision 510 is shown incorporating "in point" 512 and "out point" 514, both indicative of start and stop points for that scene in time (represented left to right). Subdivisions 520 and 530 are also labelled.

Figure 6:
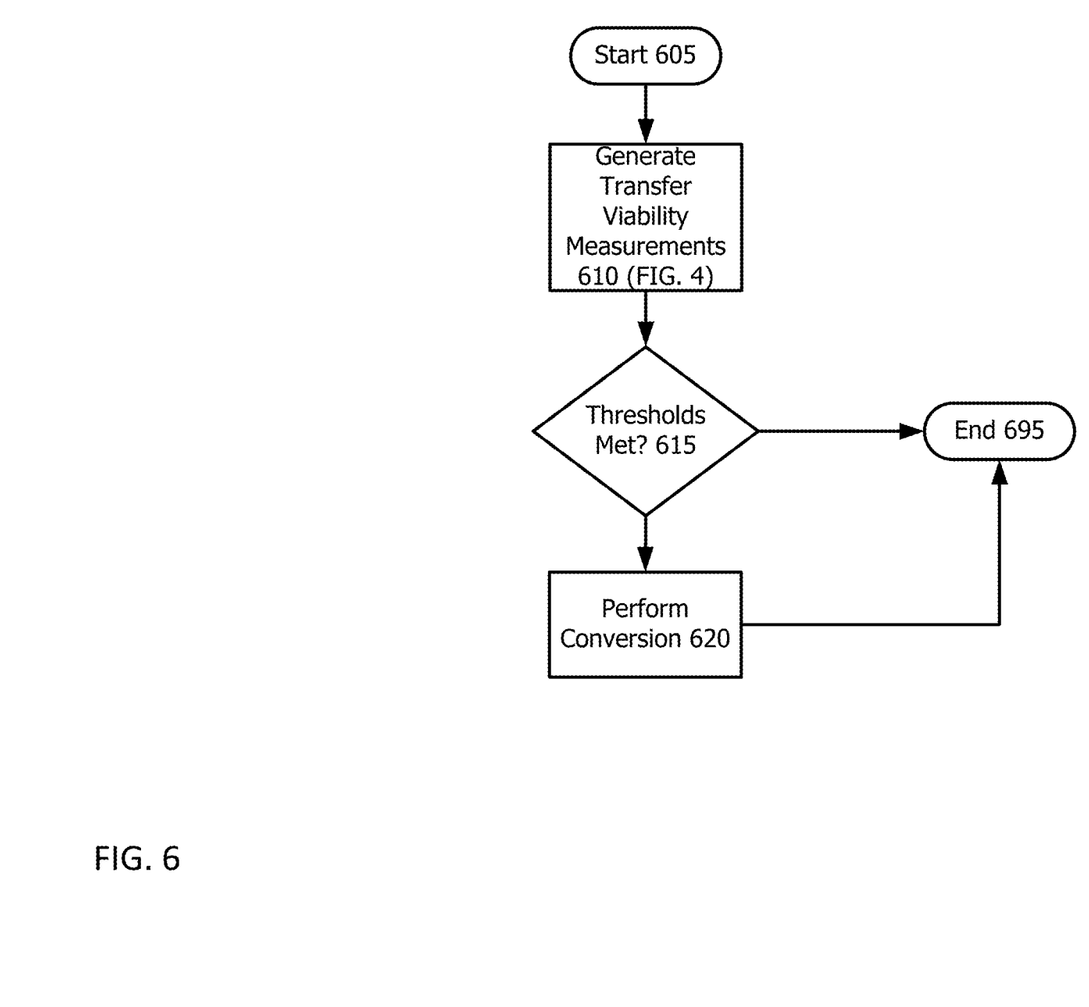
FIG. 6 is a flowchart diagram of a process for conversion of digital audiovisual media.

FIG. 6 is a functional diagram of a process for conversion of digital audiovisual media. The process begins at start 605 and ends at end 695, but could take place many times or operate cyclically on numerous digital audiovisual works.

Once the process begins at start 605, the transfer viability measurements are taken at 610 either for an individual digital audiovisual work or for a group of digital audiovisual works. This process is described with regard to FIG. 4 and will not be repeated here.

Next, if predetermined transfer viability measurement thresholds are met ("yes" at 615), then the process of performing the conversion is initiated at 620. This process is not described here in great detail, but relies upon automatic detection of the geometry of the spaces in which the various subdivisions take place, and recreations of the virtual actors to generate three hundred sixty degree videos for the associated digital audiovisual works. These may be stored and transmitted or presented for viewing with appropriate equipment.

If the thresholds are not met ("no" at 615), meaning that the digital audiovisual work or works were not suitable for conversion because they were too complex or presented problems, or after the conversion is completed at 620, then the process ends at 695.

One significant benefit of this threshold measurement at 615 is that owners or distributors of digital audiovisual content may relatively quickly evaluate the possibility of performing such conversions without a lengthy, manual evaluation process. After a "first cut" is made automatically, then human intervention and review may step in to critically evaluate the automatic processes and, potentially, to make adjustments based upon considerations not taken into account by the automatic process (such as likely success of such a release, no matter the cost to convert it or complexities that make it prohibitively expensive to convert a particular work). Still, even narrowing the field provides significant time and cost savings to content owners considering such conversion processes.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. Apparatus for generating a transfer viability measurement comprising a computing device, including processor and memory, the computing device executing instructions that cause the processor to:
   receive a digital audiovisual work and an associated textual script associated with the digital audiovisual work;
   analyze the digital audiovisual work to generate dialogue text from audio dialogue in the digital audiovisual work;
   compare the textual script with the dialogue text to generate a series of subdivisions of the digital audiovisual work;
   analyze each of the series of subdivisions using a transfer viability algorithm to generate individual transfer viability scores for each of the subdivisions and an aggregate transfer viability score for the digital audiovisual work as a whole, the individual transfer viability scores and the aggregate transfer viability score indicative of a potential for accurately converting the subdivisions and the digital audiovisual work as a whole into three hundred sixty degree video;
   output the individual and aggregate transfer viability scores; and
   begin the process of converting the digital audiovisual work into a three hundred sixty degree video when the aggregate transfer viability score is above a predetermined threshold.

2. The apparatus of claim 1 wherein the transfer viability algorithm operates for each of the series of subdivisions and incorporates one or more of (a) a size of a human face within the respective subdivision, (b) a height of a human form relative to a vertical aspect of the respective subdivision, (c) a horizontal position of a human form within the respective subdivision, (d) whether or not a human form moves transitions from wholly or partially within an audiovisual frame to wholly or partially outside of an audiovisual frame of the respective subdivision, (e) a number of human forms within the respective subdivision, (f) an estimate of the movement within the respective subdivision, (g) an estimate of movement of a camera during the respective subdivision, (h) a measure of the relative lighting of the respective subdivision, (i) an estimate of the sharpness or blurriness of the respective subdivision, (j) the density of colors on a pixel-by-pixel basis for the respective subdivision, (k) a measure of a frequency of sharp transitions between scenes during the respective subdivision, (l) a repeating pattern and texture recognition metric, (m) a hand to face distance/object occlusion metric, (n) degree of views to be recreated metric and (o) one or more handicapping or weighting variables for any one of the foregoing.

3. The apparatus of claim 2 wherein the instructions further cause the processor to detect a selected one of the human face and the human form within each of the series of subdivisions using a computer vision object recognition technique.

4. The apparatus of claim 2 wherein the sharpness or blurriness is determined with reference to two or more audiovisual frames within the respective subdivision by measuring the number of pixels that have changed in color in a later audiovisual frame relative to a later audiovisual frame.

5. The apparatus of claim 2 wherein the frequency of sharp transitions is found when a predetermined percentage of pixels change by a predetermined amount from one audiovisual frame to the immediately following audiovisual frame within the respective subdivision.

6. The apparatus of claim 1 wherein instructions further cause the processor to cease the process of converting the digital audiovisual work into a three hundred sixty degree video when one of the individual transfer viability scores is below a predetermined threshold.

7. A method of generating a transfer viability measurement comprising:
   receiving a digital audiovisual work and an associated textual script associated with the digital audiovisual work;
   analyzing the digital audiovisual work to generate dialogue text from audio dialogue in the digital audiovisual work;
   comparing the textual script with the dialogue text to generate a series of subdivisions of the digital audiovisual work;
   analyzing each of the series of subdivisions using a transfer viability algorithm;
   generating individual transfer viability scores for each of the subdivisions and an aggregate transfer viability score for the digital audiovisual work as a whole, the individual transfer viability scores and the aggregate transfer viability score indicative of a potential for accurately converting the subdivisions and the digital audiovisual work as a whole into three hundred sixty degree video;
   outputting the individual and aggregate transfer viability scores; and beginning the process of converting the digital audiovisual work into a three hundred sixty degree video when the aggregate transfer viability score is above a predetermined threshold.

8. The method of claim 7 wherein the transfer viability algorithm operates for each of the series of subdivisions and incorporates one or more of (a) a size of a human face within the respective subdivision, (b) a height of a human form relative to a vertical aspect of the respective subdivision, (c) a horizontal position of a human form within the respective subdivision, (d) whether or not a human form moves transitions from wholly or partially within an audiovisual frame to wholly or partially outside of an audiovisual frame of the respective subdivision, (e) a number of human forms within the respective subdivision, (f) an estimate of the movement within the respective subdivision, (g) an estimate of movement of a camera during the respective subdivision, (h) a measure of the relative lighting of the respective subdivision, (i) an estimate of the sharpness or blurriness of the respective subdivision, (j) the density of colors on a pixel-by-pixel basis for the respective subdivision, (k) a measure of a frequency of sharp transitions between scenes during the respective subdivision, (l) a repeating pattern and texture recognition metric, (m) a hand to face distance/object occlusion metric, (n) degree of views to be recreated metric and (o) one or more handicapping or weighting variables for any one of the foregoing.

9. The method of claim 8 further comprising detecting a selected one of the human face and the human form within each of the series of subdivisions using a computer vision object recognition technique.

10. The method of claim 8 wherein the sharpness or blurriness is determined with reference to two or more audiovisual frames within the respective subdivision by measuring the number of pixels that have changed in color in a later audiovisual frame relative to a later audiovisual frame.

11. The method of claim 8 wherein the frequency of sharp transitions is found when a predetermined percentage of pixels change by a predetermined amount from one audiovisual frame to the immediately following audiovisual frame within the respective subdivision.

12. The method of claim 7 further comprising refusing to begin the process of converting the digital audiovisual work into a three hundred sixty degree video when one of the individual transfer viability scores is below a predetermined threshold.

13. Apparatus for beginning a conversion of a digital audiovisual work into three hundred sixty degree video comprising a computing device, including processor and memory, the computing device executing instructions that cause the processor to:

receive the digital audiovisual work and an associated textual script associated with the digital audiovisual work;

analyze the digital audiovisual work to generate dialogue text from audio dialogue in the digital audiovisual work;

compare the textual script with the dialogue text to generate a series of subdivisions of the digital audiovisual work;

analyze each of the series of subdivisions using a transfer viability algorithm to generate individual transfer viability scores for each of the subdivisions and an aggregate transfer viability score for the digital audiovisual work as a whole, the individual transfer viability scores and the aggregate transfer viability score indicative of a potential for accurately converting the subdivisions and the digital audiovisual work as a whole into three hundred sixty degree video; and when the aggregate transfer viability score is above a predetermined threshold and when each of the individual transfer viability scores are below a second predetermined threshold, commence conversion of the digital audiovisual work into a three hundred sixty degree video.

* * * * *